United States Patent
Clarkson

(10) Patent No.: US 9,444,678 B2
(45) Date of Patent: Sep. 13, 2016

(54) AUTOMATIC CLOUD-BASED DISASTER RECOVERY SYSTEM INCLUDING MODIFYING A COPY COMMAND BASED ON A COPY TIME THRESHOLD

(71) Applicant: Verizon Patent and Licensing Inc., Arlington, VA (US)

(72) Inventor: David B. Clarkson, Colorado Springs, CO (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 135 days.

(21) Appl. No.: 14/448,295

(22) Filed: Jul. 31, 2014

(65) Prior Publication Data
US 2016/0036623 A1    Feb. 4, 2016

(51) Int. Cl.
G06F 11/14    (2006.01)
H04L 12/24    (2006.01)
G06F 11/20    (2006.01)

(52) U.S. Cl.
CPC ....... *H04L 41/0668* (2013.01); *G06F 11/1458* (2013.01); *G06F 11/203* (2013.01); *G06F 11/1461* (2013.01); *G06F 11/2056* (2013.01)

(58) Field of Classification Search
CPC ........... G06F 11/1451; G06F 11/1458; G06F 11/1461; G06F 11/1446; G06F 11/1466; G06F 11/1471; G06F 11/2053; G06F 11/2056; G06F 11/2066
See application file for complete search history.

(56) References Cited

U.S. PATENT DOCUMENTS

| | | | | |
|---|---|---|---|---|
| 7,536,526 | B2 * | 5/2009 | Srinivasan | G06F 17/30244 711/161 |
| 2002/0065999 | A1 * | 5/2002 | Kikuchi | G06F 11/1469 711/162 |
| 2006/0053088 | A1 * | 3/2006 | Ali | G06F 11/1448 |
| 2009/0216973 | A1 * | 8/2009 | Nakajima | G06F 11/1451 711/162 |
| 2010/0122052 | A1 * | 5/2010 | Waldspurger | G06F 11/1438 711/162 |

* cited by examiner

*Primary Examiner* — Joseph Schell

(57) ABSTRACT

Restoration devices in a cloud storage system are paired with source containers associated with a mainframe computer, and series of commands are generated based on the pairings to cause copies of data at the source containers to be stored to the restoration devices. A point-in-time copy of the copy of the data at the source containers may be stored to some restoration devices, and a second copy of the data may be stored to other restoration devices. The restoration devices may be reallocated from inactive source containers. Execution of the commands is monitored, and the commands are modified if the execution of the commands does not satisfy one or more desired conditions. For example, a cycle time associated with copying data to a restoration device may be measured, and if the cycle time exceeds a threshold, the command may be modified.

20 Claims, 12 Drawing Sheets

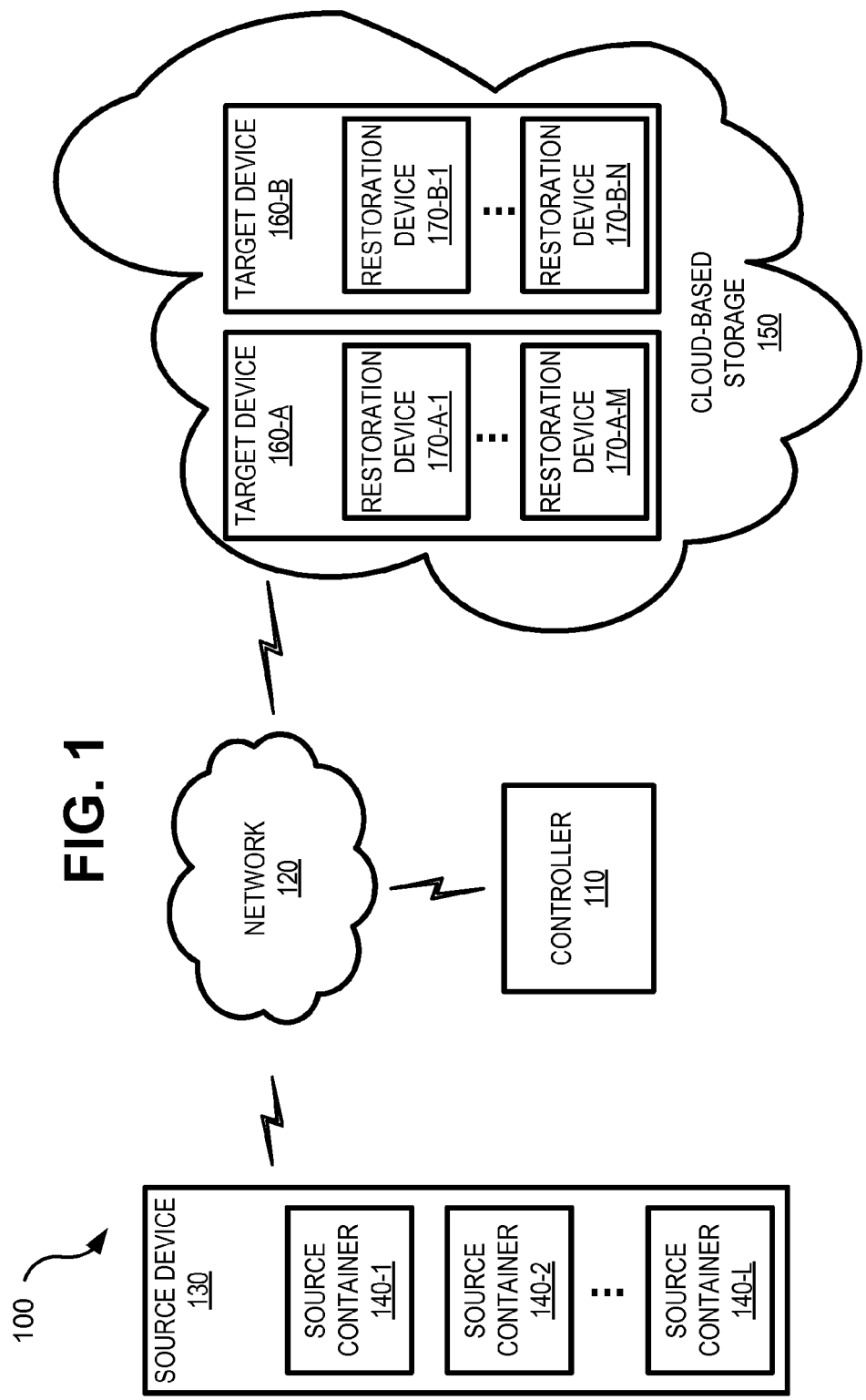

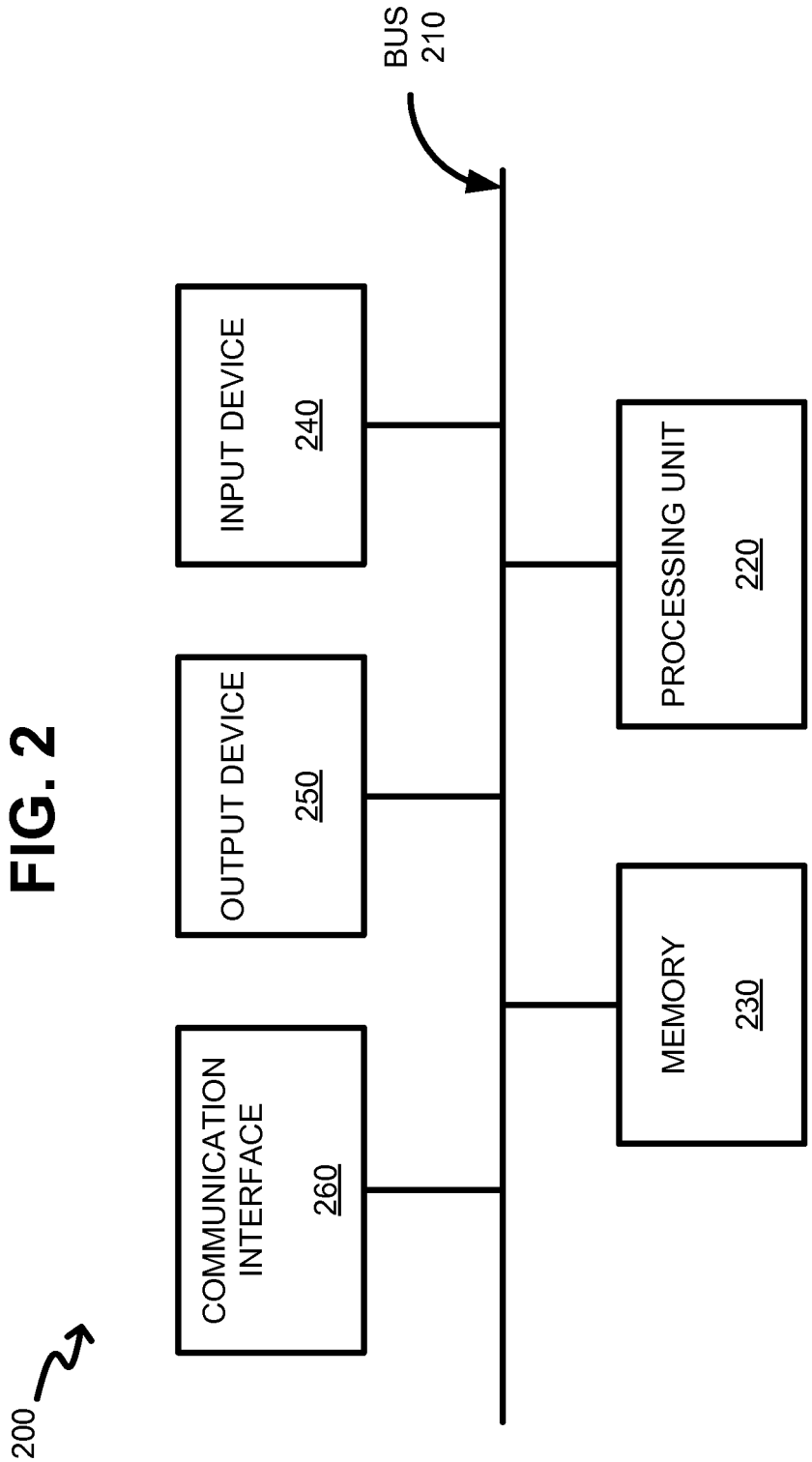

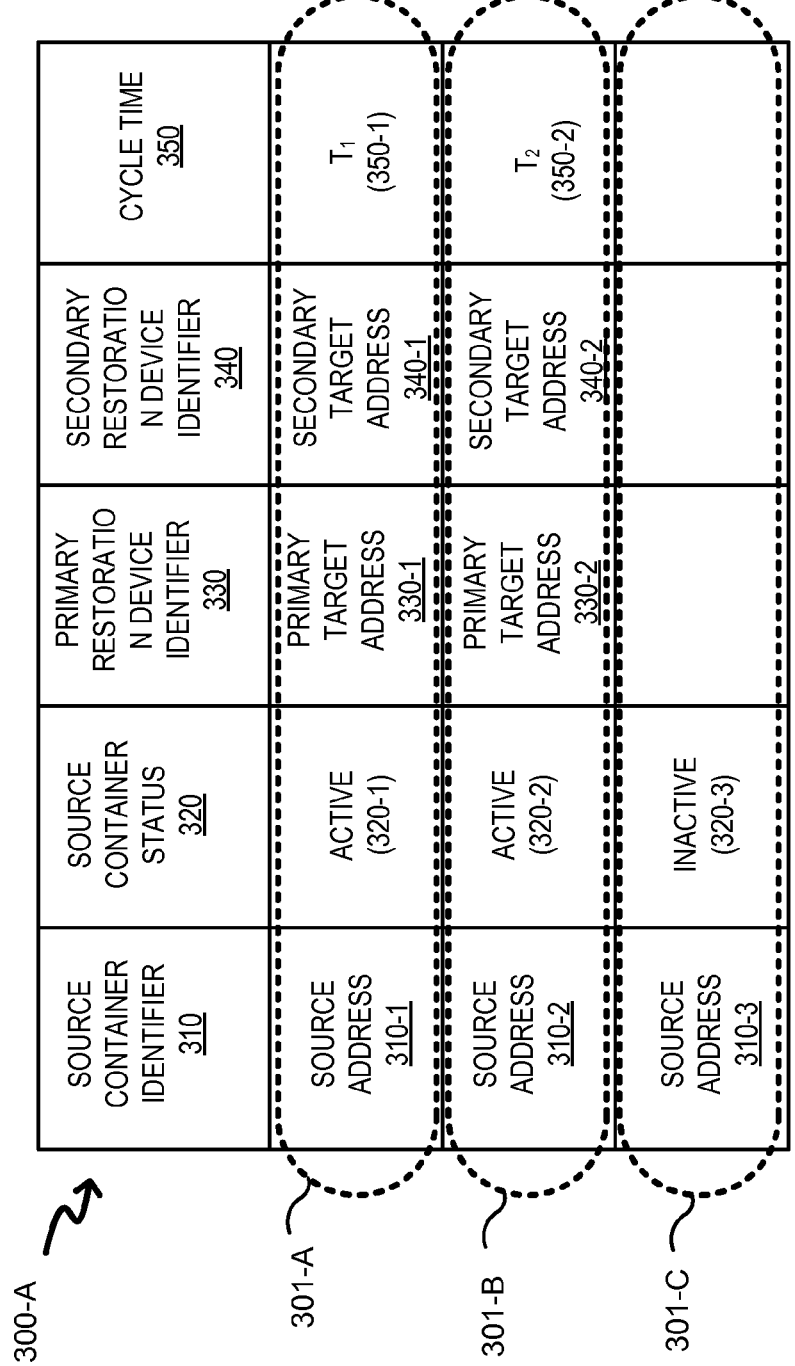

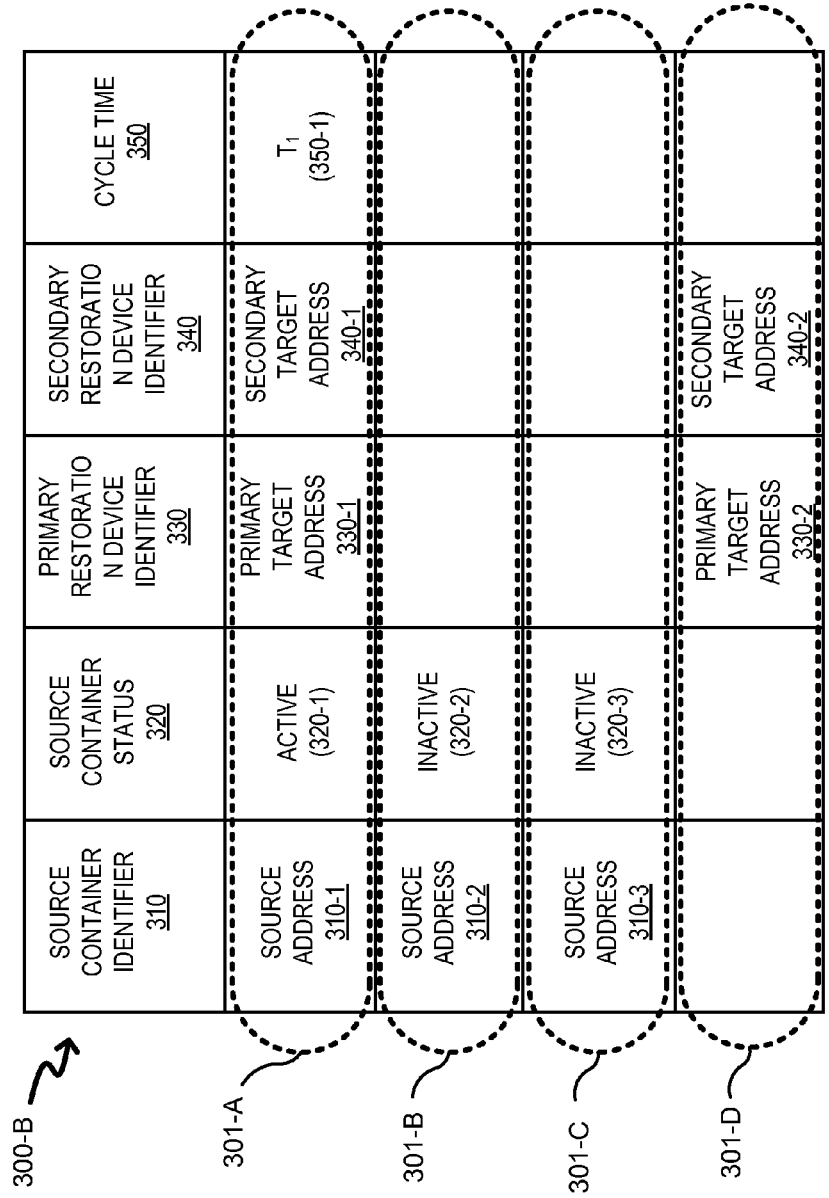

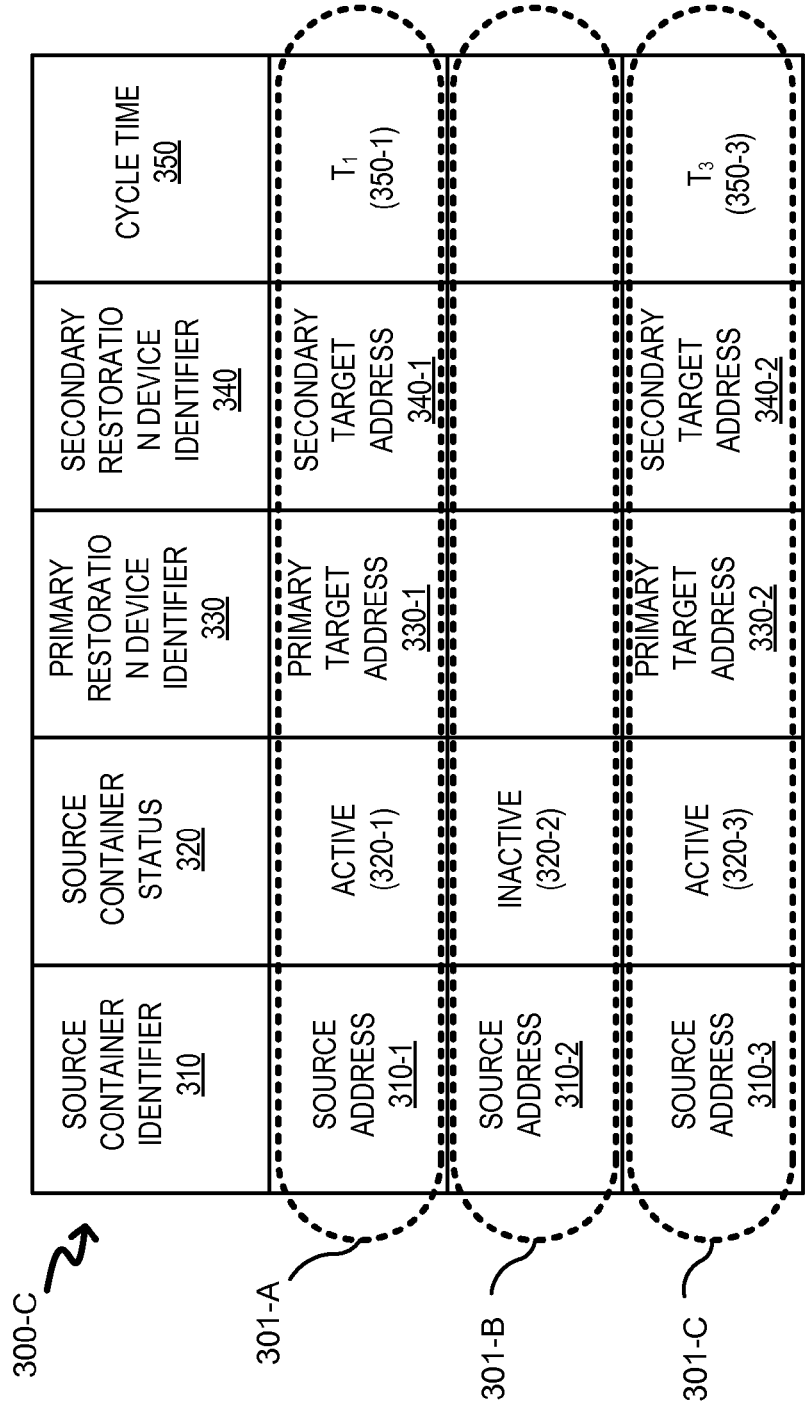

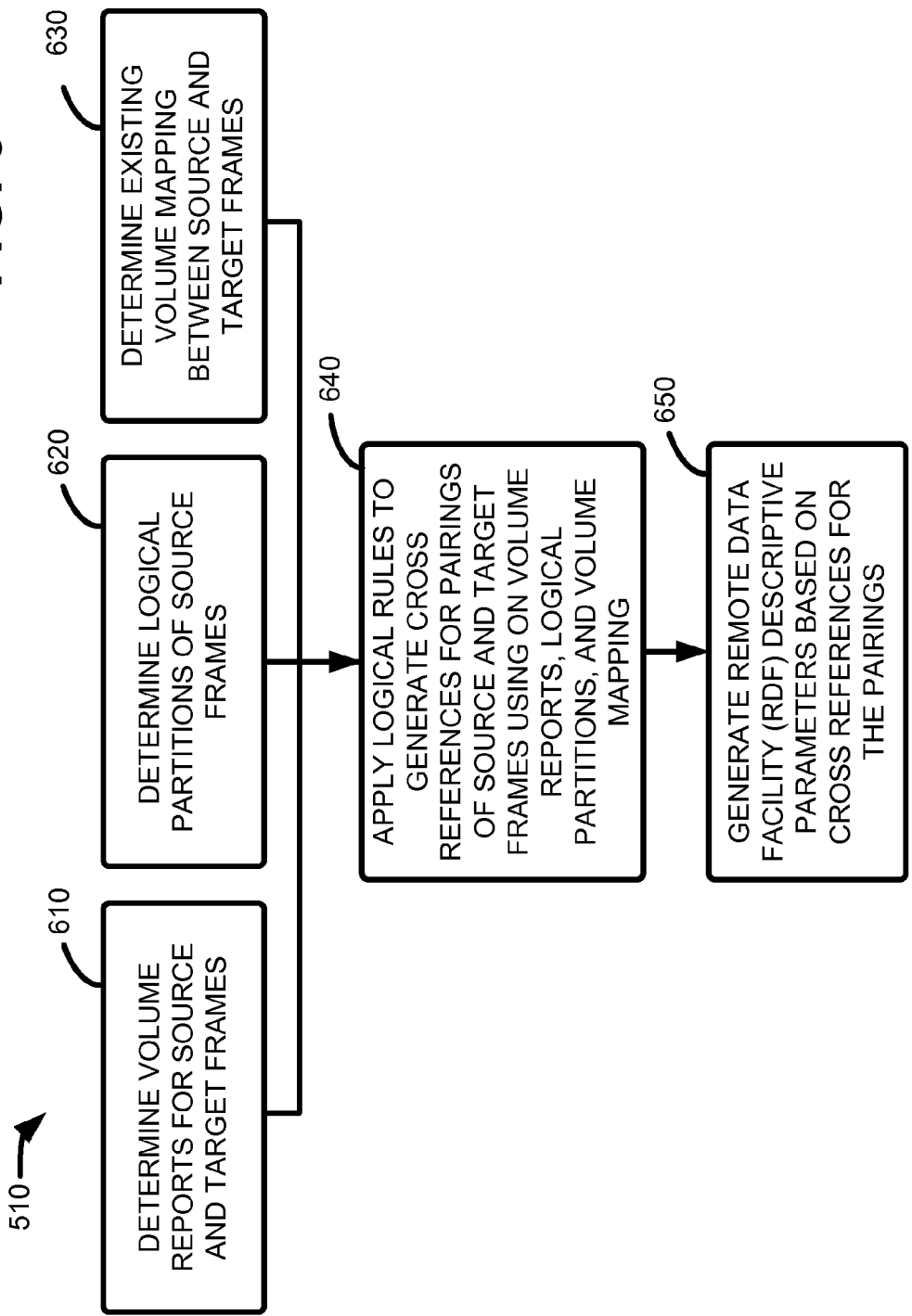

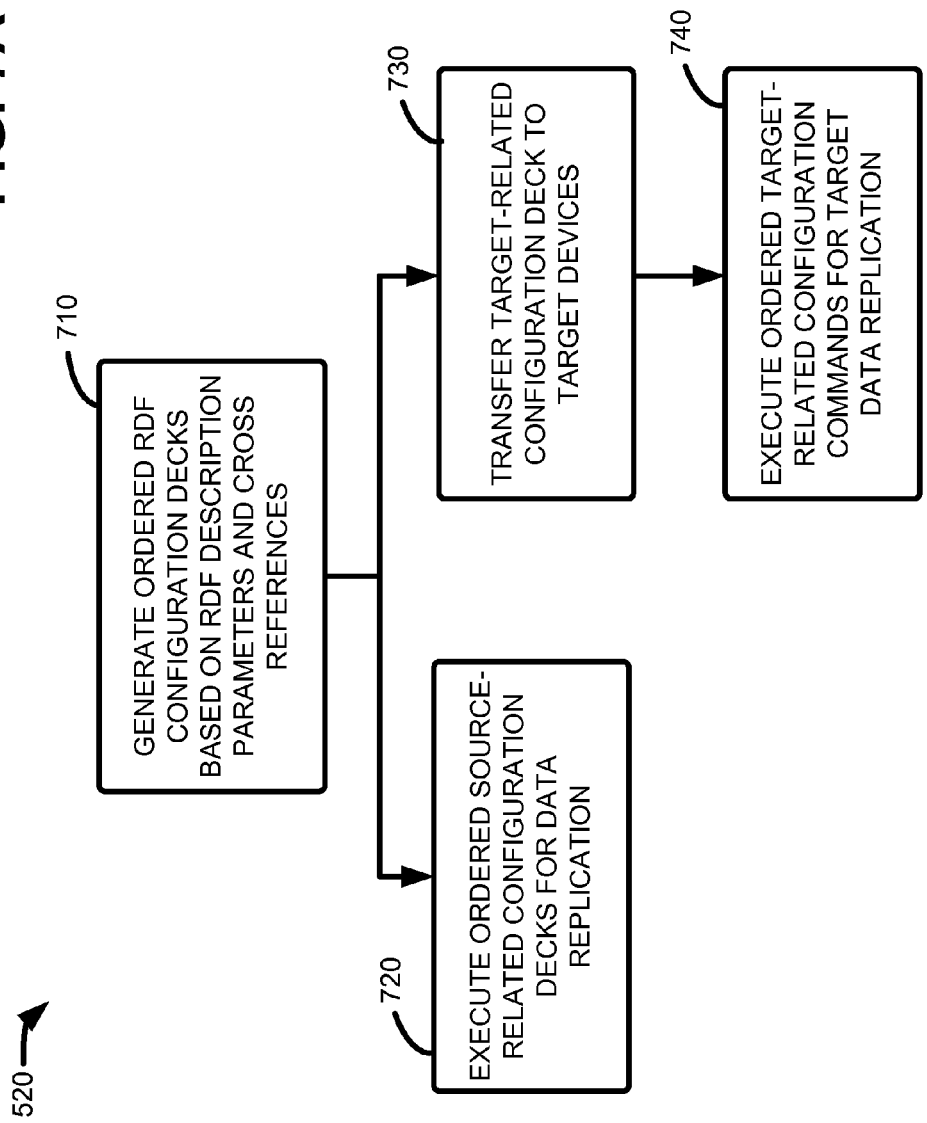

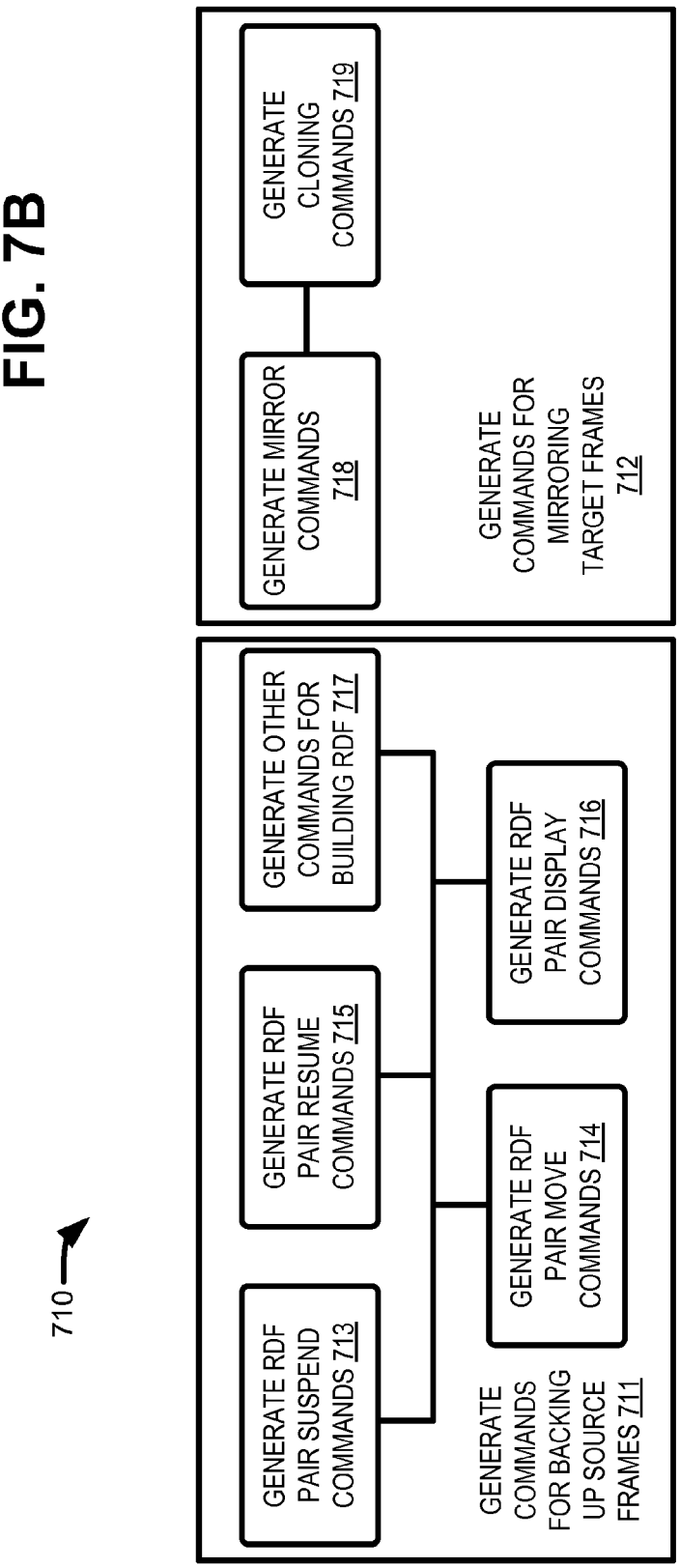

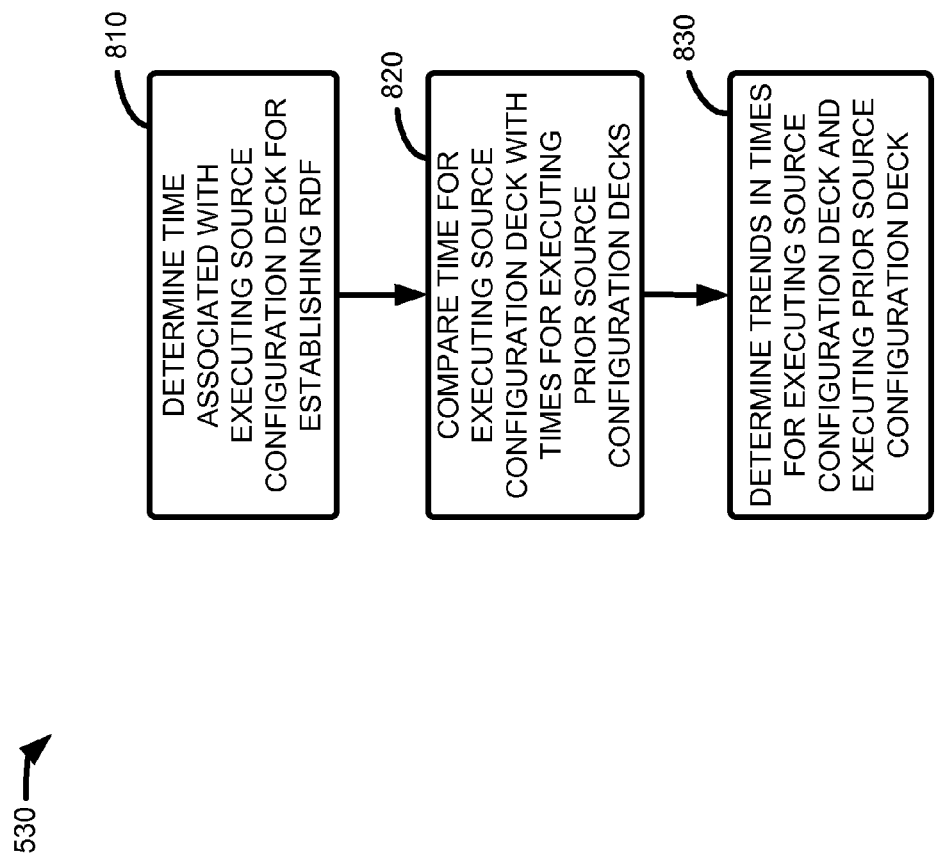

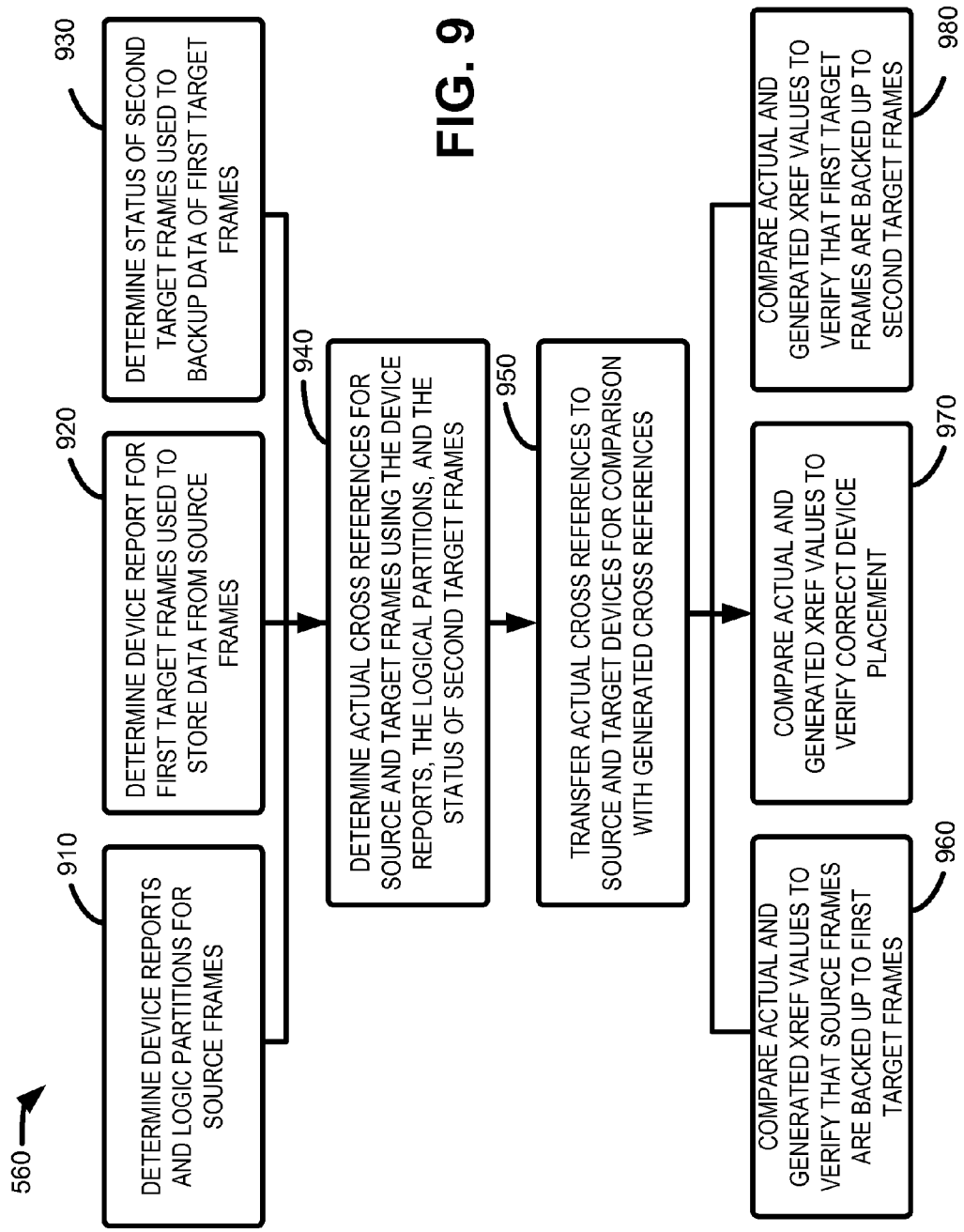

AUTOMATIC CLOUD-BASED DISASTER RECOVERY SYSTEM INCLUDING MODIFYING A COPY COMMAND BASED ON A COPY TIME THRESHOLD

BACKGROUND

A computing system, such as a mainframe computer, may back up data to a remote location to allow for disaster recovery of the data in case the computing system is damaged. For example, the computing system may use a point-to-point remote replication of data from a source device in the computing system to a target device at the target location. For example, a mainframe-based system may be run as two machines: one in a primary data center, and a second one in a backup data center that uses geographically dispersed storage, such as cloud-based storage. For further disaster recovery protection, two or more copies of the data from the primary data center may be remotely stored.

BRIEF DESCRIPTION OF THE DRAWINGS

FIG. 1 is a diagram of an exemplary environment in which systems and/or methods described herein may be implemented;

FIG. 2 is a diagram of exemplary components of a device that may correspond to one or more devices of the environment shown in FIG. 1;

FIGS. 3A-3C are schematic diagrams of exemplary control data that may be used by a controller included in the environment shown in FIG. 1 in one implementation;

FIGS. 5 6, 7A, 7B, 8, and 9 are flowcharts illustrating exemplary processes for backing up data stored at source containers to restoration devices in the environment of FIG. 1 in one implementation.

DETAILED DESCRIPTION

Figure 4:
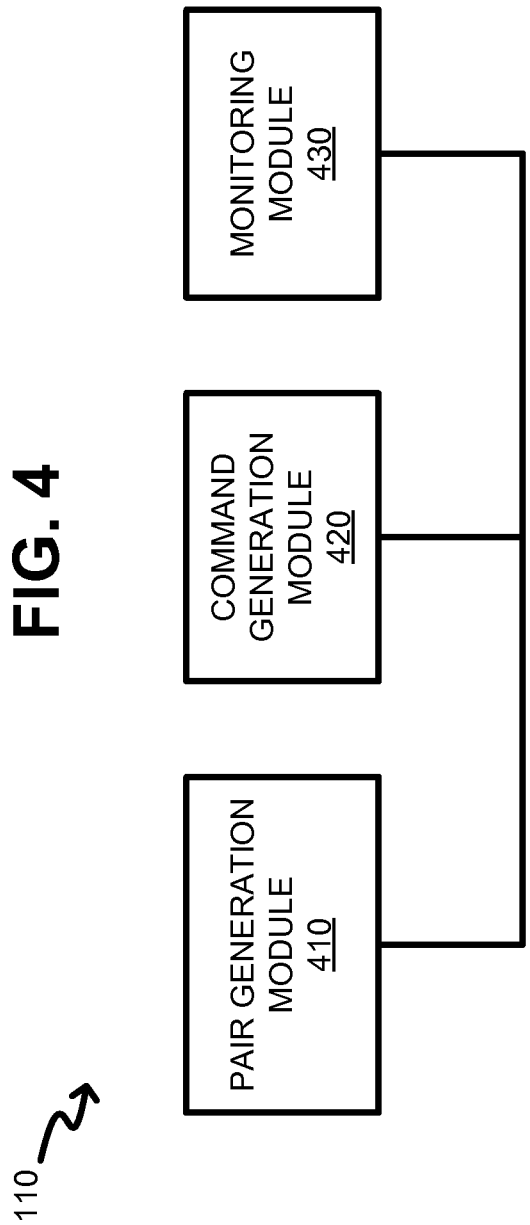
FIG. 4 is a diagram of functional components of the controller included in the environment shown in FIG. 1 in one implementation.

The following detailed description refers to the accompanying drawings. The same reference numbers in different drawings may identify the same or similar elements.

In systems and methods described herein, restoration devices in a cloud storage system are paired with source containers associated with a mainframe computer. A series of commands may be generated based on the pairings to cause copies of data at the source containers to be stored to the restoration devices. For example, a point-in-time copy of the data at the source containers may be stored to a first set of the restoration devices, and a second copy of the data may be stored to a second set of the restoration devices. The restoration devices may be reallocated from inactive source containers (e.g., source containers no longer storing data). Execution of the commands may be monitored, and the commands may be modified if execution of commands does not satisfy a desired condition. For example, a cycle time associated with acquiring the data from a source container and copying the data to an associated restoration device may be measured, and if the cycle time exceeds a threshold, the associated command may be modified. In other implementation, the actual pairs representing restoration devices used to store backup data associated with source containers may be identified and compared to the intended pairs of source and restoration devices used to generate the storage commands. In this implementation, the associate commands may be revised if, for example, the actual source and restoration device's pairs differ from the intended pairs of source and restoration devices. For example, the source container may be paired to a different restoration device and the command may be modified to reflect the different pairing. As used herein, the term "container" is broadly interpreted to include a memory device (e.g., a disk drive, tape, etc.) or a storage location associated with a portion of memory device. The "container" may further include multiple storage locations and/or devices logically configured as a single storage device.

FIG. 1 is a diagram of an exemplary environment 100 in which systems and/or methods described herein may be implemented. As illustrated in FIG. 1, environment 100 may include a controller 110, a network 120, a source device 130 that includes source containers 140 storing source data (shown in FIG. 1 as source containers 140-1, 140-2, ... 140-L), and a cloud-based storage 150. Cloud-based storage 150 may include one or more target devices 160 (shown in FIG. 1 as target devices 160-A and 160-B), and each target device 160 may include one or more restoration devices 170 (shown in FIG. 1 as restoration devices 170-A-1 to 170-A-M associated with target device 160-A and restoration devices 170-B-1 to 170-B-N associated with target device 160-B) to store backup copies of the data stored at source containers 140.

Controller 110 may determine and store information identifying data replication parameters, and controller 110 may use this information to generate the storage/backup commands. For example, controller 110 may identify source device 130 that includes source containers 140 and pair the source containers 140 to locations where one or more copies of the source data may be stored. Controller 110 may further determine, for example, that source data from certain source containers 140 may be stored to certain restoration devices 170. Controller 110 may associate source containers 140 with restoration devices 170, and store the source data based on the association.

Controller 110 may determine and/or store information linking source containers 140 and restoration devices 170. Controller 110 may further determine and/or store data identifying source containers 140 and/or restoration devices 170 that are not linked, such as an source containers 140 and/or restoration devices 170 that are deactivated, currently unused (e.g., waiting to receive a pairing), undergoing maintenance, etc. For example, controller 110 may determine and/or data pairing of a source container 140 to a restoration device 170 and/or a pairing of two restoration devices 170, such as a pairing of a restoration device 170 associated with target device 160-A with another restoration device 170 associated with target device 160-B. In operation, controller 110 may generate and/or populate commands with the pairing data.

Controller 110 may act as a "go-between" between source devices 130 and cloud-based storage 150. In some implementations, source device 130 may access and/or store data to cloud-based storage 150 via controller 110. In other implementations, source device 130 may access and/or store data to cloud-based storage 150 directly via network 120 (e.g., without involving controller 110).

As described herein, controller 110 may cause a number of point-in-time copies and replications of source data, associated with source device 130, to be generated and stored. The point-in-time copies may be associated with multiple targets. For example a point-in-time copy of the source data may be stored to target device 160-A, and a copy of the backup data (e.g., stored at target device 160-A), may be replicated to target device 160-B. In certain modes of operation, controller 110 may create (e.g., define in a logical network) restoration devices 170 and/or reallocate restoration devices 170 previously used to store source data (e.g., from source containers 140 that are no longer being used). Controller 110 may perform the disk replications (e.g., from source device 130 to target device 160-A) using, for example, Metro Mirror® from International Business Machines Corporation (IBM), Symmetrix Remote Data Facility (SRDF®) from EMC Corporation, or TrueCopy® from Hitachi Data Systems Corporation (HDS) of Santa Clara, Calif. Additionally, controller 110 may create point-in-time copies (e.g., from target device 160-A to target device 160-B) using, for example, FlashCopy® from IBM, TimeFinder®/Clone from EMC Corp., or ShadowImage® from HDS.

Network 120 may include one or more networks of various types. For example, network 120 may include a cable network (e.g., an optical cable network), a wireless satellite network, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., a Public Switched Telephone Network (PSTN)), a local area network (LAN), a wide area network (WAN), a metropolitan area network (MAN), an intranet, and/or the Internet.

Source device 130 may include a type of computer system, such as a mainframe, minicomputer, or personal computer, a type of telephone system, such as a plain-old telephone service (POTS) telephone or a session initiation protocol (SIP) telephone, and/or some other similar type of device that is capable of transmitting and receiving information to/from the network 120.

Cloud-based storage 150 may include a network for accessing target devices 160, and target devices 160 may include cloud storage containers (e.g., associated with restoration devices 170) for access by controller 110. Cloud-based storage 150 may include a device (e.g., a network device, a server, a computer system, etc.), data (e.g., availability information, license information, etc.), a service (e.g., a load balancing service, network information collection, etc.), or any other type of resource available for accessing target devices 160. For example, cloud-based storage 150 may include a gateway, a router, a switch, a firewall, a network interface card (NIC), a hub, a bridge, a proxy server, a multiplexer, or some other type of device that processes and/or transfers traffic to target device 160. Cloud-based storage 150 may also include one or more short-term and/or long-term memory devices used to store data.

Although FIG. 1 shows example devices/networks of environment 100, in other implementations, environment 100 may include fewer devices/networks, different devices/networks, differently arranged devices/networks, or additional devices/networks than depicted in FIG. 1. Alternatively, or additionally, one or more devices/networks of environment 100 may perform one or more other tasks described as being performed by one or more other devices/networks of environment 100.

FIG. 2 is a diagram of exemplary components of a device 200 that may correspond to one or more devices of environment 100 shown in FIG. 1, such as controller 110, a component (e.g., a node) of network 120, source device 130, a component of cloud-based storage 150, and/or target device 160. In one exemplary implementation, one or more of the devices of environment 100 may include one or more devices 200 or one or more components of device 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application-specific integrated circuits (ASICs), field-programmable gate array (FPGAs), etc.

Memory 230 may include a random-access memory (RAM) or another type of dynamic storage device that stores information and instructions for execution by processing unit 220, a read-only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touch screen display, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of environment 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

FIGS. 3A-3C are diagrams of exemplary control data 300 (shown as control data 300-A in FIG. 3A, control data 300-B in FIG. 3B, and control data 300-C in FIG. 3C) that may be stored by controller 110 (FIG. 1). As shown in FIGS. 3A-3C, control data 300 may include data records 301 (shown in FIGS. 3A-3C as data records 301-A, 301-B, 301-C, and 301-D). Each data record 301 may include, for example, a source container identifier (or address) 310, a source container status 320, a primary restoration device identifier (or address) 330, a secondary restoration device identifier (or address) 340, and a cycle time 350. For example, a first copy of the data associated with source container identifier 310 may be stored at a location associated with primary restoration device identifier 330, and a second copy of the data associated with source container identifier 310 may be stored at a location associated with secondary restoration device identifier 340. Cycle time 350 may identify an amount of time used to write data associated with source container identifier 310 to primary restoration device identifier 330 and/or secondary restoration device identifier 340.

In the example shown in FIG. 3A, first data record 301-A may include information identifying a first source container identifier 310-1 (e.g., information identifying an associated source container 140). First data record 301-A may further include status information 320-1 indicating that the first source container identifier 310-1 is active (e.g., the associated source container 140 stores data to be copied to primary restoration device identifier 330-1 and/or secondary restoration device identifier 340-1). First data record 301-A may further include information indicating cycle time $T_1$ 350-1 passed when acquiring and storing data from first source container identifier 310-1 to primary restoration device identifier 330-1 and/or secondary restoration device identifier 340-1.

Continuing with the example shown in FIG. 3A, control data 300-A may further include a second data record 301-B that identifies a second source container identifier 310-2 that has an active status 320-2. Second data record 301-B may further include information pairing second source container identifier 310-2 to a primary restoration device identifier 330-2 and/or secondary restoration device identifier 340-2. Second data record 301-B may further include information indicating that controller 110 used cycle time $T_2$ 350-2 to acquire data from source container identifier 310-2 and to copy the data to primary restoration device identifier 330-2 and/or secondary restoration device identifier 340-2.

Continuing with the example shown in FIG. 3A, control data 300-A may further include a third data record 301-C that includes information identifying a third source container identifier 310-3 that has an inactive status 320-3 (e.g., storing no data to be copied to a target device 160 associated with a primary restoration device identifier 330 and/or a secondary restoration device identifier 340). For example, a source container 140, associated with the third source container identifier 310-3, may not be in use or may store data that is not backed up (e.g., temporary data). Since third source container identifier 310-3 is associated with inactive status 320-3, controller 110 may not generate commands to acquire and store data from third source container identifier 310-3. Thus, third data record 301-C does not pair third source container identifier 310-3 with either a primary restoration device identifier 330 or a secondary restoration device identifier 340.

Referring now to FIG. 3B, control data 300-B may reflect a change to the status 320 associated with a modified second data record 301-B. Specifically, status 320-2 associated with second source container identifier 310-2 has changed from an active (in control data 300-A) to an inactive status 320-2 (in control data 300-B), indicating data should not longer be stored at second source container identifier 310-2. In this example, because second source container identifier 310-2 is associated with inactive status 320-2, a fourth data record 301-D may be created to store information identifying primary restoration device identifier 330-2 and/or secondary restoration device identifier 340-2 and indicating that primary restoration device identifier 330-2 and/or secondary restoration device identifier 340-2 are unpaired. Because primary restoration device identifier 330-2 and secondary restoration device identifier 340-2 are unpaired and no longer being used, fourth data record 301-D does not identify a source container identifier 310 paired to primary restoration device identifier 330-2 and secondary restoration device identifier 340-2.

Referring now to FIG. 3C, control data 300-C may include a modified third data record 301-C. In control data 300-C, status 320-3 of third source container identifier 310-C has changed from inactive (in data record 300-B) to active (in data record 300-C), indicating that data stored at third source container identifier 310-3 should be copied. Controller 110 may determine (e.g., based on control data 300-B) that primary restoration device identifier 330-2 and/or secondary restoration device identifier 340-2 were unused and, therefore, available to be paired with now-activate source container identifier 310-3. Controller 110 may then store in data record 301-C, as shown in FIG. 3C, information pairing third source container address data record 310-3 with primary restoration device identifier 330-2 and/or secondary restoration device identifier 340-2. Third data record 301-C may further include information indicating that cycle time $T_3$ 350-3 was used to read data from third source container identifier 310-3 and to write the data to primary restoration device identifier 330-2 and/or secondary restoration device identifier 340-2.

Although FIGS. 3A-3C show exemplary elements that may be included in control data 300, in other implementations, control data 300 may include fewer elements, different elements, differently arranged elements, or additional elements than depicted in FIGS. 3A-3C. For example, control data 300 may include information identifying a status of a restoration device 170 (e.g., an associated primary restoration device identifier 330 and/or a secondary restoration device identifier 340), such as whether the restoration device 170 is ready to store data. In another example, control data 300 may include additional information (e.g., additional monitoring results) regarding the pairing of source container identifiers 310 and restoration device identifiers 330/340, such as identifying a number of dropped data units (e.g., a number of data units stored at source container identifier 310 that are lost/dropped while being copied to restoration device identifiers 330/340). Control data 300 may further include information regarding components of cycle time 350, such as a first time length to read data from source container identifier 310 and write a copy of the data to a buffer and a second time length time to read the copy of the data from the buffer and write the copy of the data to a restoration device identifier 330/340, Furthermore, one or more elements of control data 300 may store information described as being stored by one or more other elements of control data 300.

FIG. 4 is a schematic diagram of exemplary functional components that may be included controller 110 in one implementation. As shown in FIG. 4, controller 110 may include a pair generation module 410, a command generation module 420, and a monitoring module 430.

Pair generation module 410 may populate control data 300 (FIGS. 3A-3C), such as to identify source container identifiers 310, primary restoration device identifiers 330, and/or secondary restoration device identifiers 340 and to form relationship between the identified source container identifiers 310, primary restoration device identifiers 330, and/or secondary restoration device identifiers 340. For example, pair generation module 410 may interface with source devices 130 to identify source container identifiers 310 and may interface with target devices 160 to determine primary restoration device identifiers 330 and secondary restoration device identifiers 340.

In another example, pair generation module 410 may interface with controller 110 to identify primary restoration device identifiers 330 and secondary restoration device identifiers 340. For example, pair generation module 410 may determine pairs of source container identifiers 310 and primary restoration device identifiers 330 (e.g., restoration devices 170 storing data from source containers 140) and/or pairs of primary restoration device identifiers 330 and secondary restoration device identifiers 340 (e.g., restoration devices 170 mirroring data stored at other restoration devices 170) previously used to backup data.

Pair generation module 410 may further determine when source containers 140 and/or restoration devices 170 are active, and update the pairing used to backup data. For example, if a source container 140 become inactive, pair generation module 410 may reallocate the restoration devices 170 previously paired to the source container 140 to another, different source container 140. For example, pair generation module 410 may create appropriate pairings of source containers 140 and restoration devices 170 or pairings of restoration devices 170 using pivot tables and/or logic functions.

In one implementation, pair generation module 410 may format and load the pairings, for example, to source device 130 so that data from active source containers 140 may be forwarded to appropriate restoration devices 170. For example, restoration device identifiers 330/340 may be formatted to be understood by source device 130.

Continuing with FIG. 4, controller 110 may include command generation module 420 that forms commands based on the pairings formed by pair generating module 410. For example, the generated commands may be restructured extended executor (REXX)-based processes for disk replication and/or point-in-time copying applications.

With reference to control data 300 in FIGS. 3A-3C, command generation module 420 may populate and/or generate generic commands, such as "Copy Data from a First Location to a Second Location," with the first location corresponding to a source container identifier 310 and the second location corresponding to a paired primary restoration device identifier 330 and/or a secondary restoration device identifier 340. For example, command generation module 420 may generate a command to copy data from a source container identifier 310 to an associated primary restoration device identifier 330. In another example, command generation module 420 may generate a command related to copying data stored at a primary restoration device identifier 330 to a secondary restoration device identifier 340.

In another implementation, command generation module 420 may cause the generated commands to be executed by storage device 130 and/or target device 160 based on one or more logical rules. For example, command generation module 420 may order and/generate the commands so that the commands cause data to be first read from contiguous source containers 140 and/or write to contiguous restoration devices 170 before attempting to read from other non-contiguous source containers 140 and/or restoration devices 170. In addition or alternatively, command generation module 420 may generate the commands so that a write operation related to a restoration device 170 (e.g., copying data from the source container 140) is completed before starting a read operation related to the restoration device 170 (e.g., coping the data to a second, different restoration device 170). In another example, command generation module 420 may generate the commands based on network conditions, such as to delay access a source container 140 associated with congestions or other type of problem. In yet another example, command generation module 420 may schedule execution of the commands to backup data (e.g., by sending the commands at particular times), such as to schedule execution of the commands during periods of low activity on network 120, source device 130, and/or target device 160.

Command generation module 420 may further generate administrative commands. For example, command generation module 420 may generate a command to determine status information summarizing a configuration of source containers 140 and associated restoration devices 170. The generated commands may further determine a time for completing a command (e.g., cycle time 350 in FIG. 3), etc. In another example, command generation module 420 may generate a command to format/initiate restoration device 170 to receive data. In yet another example, a target device 160 may correspond to two or more physical devices that are logically associated in a remote replication session, and a command may relate to storing data from a source device 130 to the group, storing data within the group, and/or storing data between different remote replication session groups.

In another example, the generated commands may cause a Unit Control Block (UCB) associated with source device 130 and/or target device 160 to be updated. The UCB is a memory structure, or a control block, that describes any single input/output peripheral device (unit), or an exposure (alias), to the operating system. Some of the information stored in the UCB are: device type (disk, tape, printer, terminal, etc.), address of the device, subchannel identifier and device number, channel path ID (CHPID) which defines the path to the device, for some devices the volume serial number (VOLSER), and other information, including OS Job Management data.

Command generation module 420 may also generate a command to backup data in one of a synchronous mode or an asynchronous mode. In the synchronous mode, controller 110 may wait until target device 160 has acknowledged a prior write operation before a next write operation is initiated, such as to verify that a replicated copy of data stored at target device 160 corresponds to the original data stored at source device 130. In the asynchronous mode, changes may be made to target device 160 at defined intervals, thereby reducing bandwidth requirements and minimizing adverse effects on source device 130 in exchange for possible latency in updating a restoration device 170 to reflect changes to a corresponding source container 140.

Continuing with FIG. 4, controller 110 may further include monitoring module 430 to collect data regarding execution of the generated commands. Monitoring module 430 may periodically (e.g., hourly, daily, weekly, etc.) compare contents of a source container 140 with data stored in a corresponding restoration device 170, determine the stability of the backup data, etc. For example, monitoring module 430 may determine a status of the executing the generated commend. Monitoring module 430 further determine whether contents of source containers 140 are correctly stored by restoration devices 170, such as to compare contents of pairs of source container 140 and restoration devices 170. Monitoring module 430 may further confirm that control data 300 includes source container identifiers 310 for a site, that active source container identifiers 310 are properly mapped (e.g., paired with) primary restoration device identifiers 330, and that primary restoration device identifiers 330 are mapped to secondary restoration device identifiers 340.

Monitoring module 430 may further monitor cycle times 350 (FIGS. 3A-3C) to determine if any of the cycle times 350 exceed a threshold, thereby indicating that the generated pairings and/or the generated commands may be improper. In another example, monitoring module 430 may examine trends in cycle times 350 to determine if cycle times 350 are increasing over time, thereby indicating a possible degradation of a storage configuration based on the generated parings. In this example, monitoring module 430 may determine if a cycle time 350, associated with a pairing, changes by more than a threshold amount between two different executions of the commands.

If monitoring module 430 identifies a problem with backing up data from source device 130 stored to cloud-based storage 150 (e.g., one or more cycle times 350 exceed a threshold value), monitoring module 430 may cause pair generation module 410 to revise the pairings and/or cause command generation module 420 to generate new instructions.

Although FIG. 4 shows exemplary functional components of controller 110, in other implementations, controller 110 may include fewer functional components, different functional components, differently arranged functional components, or additional functional components than depicted in FIG. 4. Additionally, or alternatively, one or more functional components of controller 110 may perform one or more other tasks described as being performed by one or more other functional components of controller 110.

Figure 5:
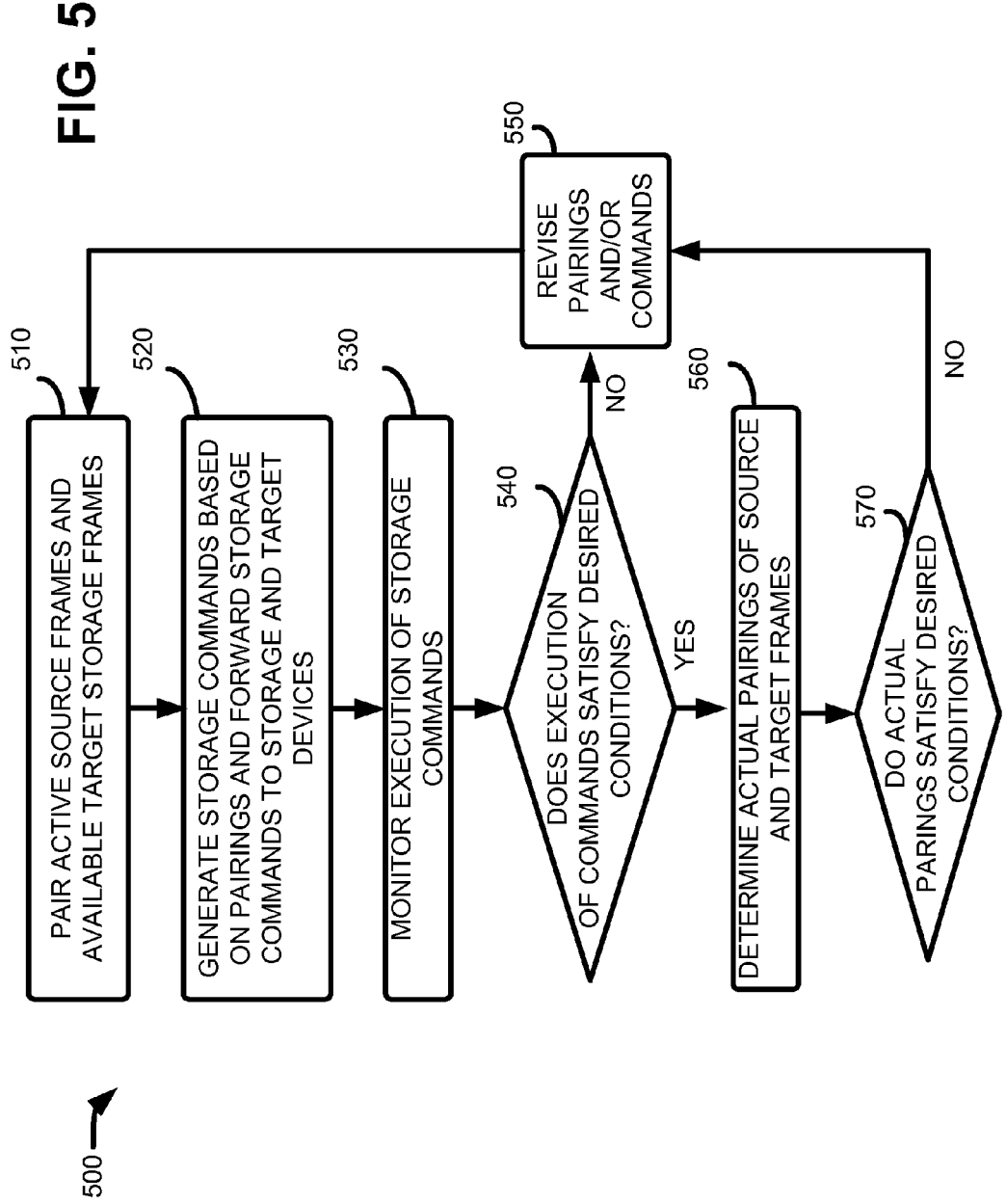

FIG. 5 is a flow diagram of an exemplary process 500 for data stored at source containers 140 to be copied to one or more restoration devices 170 according to an implementation described herein. Process 500 is described with respect to components in environment 100 and control data 300 in FIGS. 3A-3C. In one implementation, process 500 may be performed by controller 110. Alternatively, or additionally, some or all of process 500 may be performed by another device or group of devices, including or excluding controller 110.

As shown in FIG. 5, process 500 may include pairing active source frames (e.g., source containers 140 storing data to be backed up) and available target frames (e.g., restoration devices 170) (block 510). For example, controller 110 may identify restoration devices 170 previously used for data storage related to source devices 130. As described above with respect to FIGS. 3A-3C, controller 110 may store control data 300 identifying restoration devices 170 that have been released from prior pairings with an inactive source container 140. In another example, controller 110 may interface with target devices 160 to identify available (e.g., unused) restoration devices 170, such as restoration devices 170 that have not been updated and/or accessed within a particular time period.

As further described above with respect to FIGS. 3A-3C, pair generation module 410 may store control data 300 pairing active source containers 140 (e.g., associated with source container identifiers 310) with available restoration devices 170 (e.g., associated with primary restoration device identifiers 330). In addition, controller 110 may further associate, in control data 300, available restoration devices 170 (e.g., associated with primary restoration device identifiers 330) with available backup restoration devices 170 (e.g., associated with secondary restoration device identifiers 340). For example, controller 110 may use volume (or device) reports on source devices 130 and target devices 160 to determine source container identifiers 310 and restoration device identifiers 330/340, and controller 110 may determine appropriate pairings using pivot tables and/or spreadsheet functions. In one implementation, information regarding the pairings may be sent to source devices 130 and/or target devices 160.

As shown in FIG. 5, process 500 may further include forming backup commands based on pairing the active source containers 140 with to the available restoration devices 170 (block 520). The commands may relate to an automated process to manipulate configuration control parameters associated with cloud-based storage 150. For example, command generation module 420 may form commands representing a series of jobs in a solution to copy and store data from source containers 140 to restoration devices 170. The instructions may include, for example, determining data stored at active source containers 140, storing a copy of the data to a first set of restoration devices 170 (e.g., to a paired primary restoration device identifiers 330), and then further storing a second copy of the acquired data to a second set of restoration devices 170 (e.g., to a secondary restoration device identifiers 340). For example, controller 110 may to modify a previously created data storage configuration (e.g., such as shown in FIG. 3A), to reflect deactivation of source containers 140 (e.g., as shown in FIG. 3B) and pairing an active source container 140 to one or more available restoration devices 170 to backup data stored at the active source container 140 (e.g., as shown in FIG. 3C). In one configuration, a separate command may be generated to store data from each source container identifier 310 to each primary restoration device identifier 330 (FIGS. 3A-3C). Alternatively or in addition, a separate command may be generated for backing up data stored at each primary restoration device identifier 330 to each secondary restoration device identifier 340 (FIGS. 3A-3C).

Forming the commands in block 520 may include revising an existing storage configuration. For example, as described above with respect to FIGS. 3A-3C, the commands formed in block 530 may store data from an active source container identifier 310 to restoration device identifiers 330/340 previously paired with an inactive storage address. For example, one or more of the formed commands may cause a source container identifier 310 and/or a restoration device identifier 330/340 to be activated. Forming the commands in block 530 may include, for example, a clone group creation to designate a group of restoration device identifiers 340 (e.g., identifying a group of restoration devices 170) to receive and store data from other restoration devices 170.

Forming the commands in block 520 may include determining a time for execution of the commands. For example, certain types of data (e.g., time sensitive data) may be backed up synchronously such that changes to data in a source frame may be copied to a target frame in near-real time, while other types of data (e.g., less critical data and/or data that tends to not change significantly over time) may be backed up asynchronously (e.g., periodically at particular times during periods of low network activity). For example, the commands may include timing information and/or controller 110 may forward the commands at desired execution times. For example, the commands may cause data to be acquired from active source container 140 when source container 140 is offline (e.g., not being updated with new information). In another example, the commands may cause data from active source container 140 to be acquired when source container 140 is online (e.g., being updated with new information), but schedule the commands when source container 140 and/or network 120 have capacity to transfer data. In this example, controller 110 may monitor activities levels in source devices 130, target devices 160, and/or network 120 and cause the data to be copied when the monitored activities levels are below a threshold level.

Forming the commands in block 520 may also include determining an order of processing associated with the commands, such as ordering the commands to cause data from source container identifiers 310 to be stored to primary restoration device identifiers 330 before backing up data stored at primary restoration device identifiers 330 to secondary restoration device identifiers 340. The commands may further prevent changes in data at source container identifiers 310 to be written to primary restoration device identifiers 330 while data from primary restoration device identifiers 330 is being written to secondary restoration device identifiers 340, thereby preserving consistency of data at primary restoration device identifiers 330 and secondary restoration device identifiers 340. In another example, the formed commands may cause data from a single source container identifier 310 to be stored to multiple primary restoration device identifiers 330 and/or to multiple secondary restoration device identifiers 340 and may cause the multiple primary restoration device identifiers 330 and/or to multiple secondary restoration device identifiers 340 to be updated consistently (e.g., to reflect data at the source container identifier 310 at a single point-in-time).

Forming the commands in block 520 may further include forming a summary of the resulting storage configuration, such as identifying source containers 140 being backed up and mapping storage containers 140 to one or more restoration devices 170. The commands may further include commands for outputting status information regarding execution of the commands (e.g., to identify completed and/or pending commends).

Continuing with FIG. 5, process 500 may further include monitoring execution of the commands (block 530) and determining whether the execution of the command satisfies desired conditions (block 540). For example, monitoring module 430 may also monitor cycle times 350 (FIGS. 3A-3C) associated with each of the pairings, such as determine an amount of time to acquire data from each active source container identifier 310 and/or write the data to primary restoration device identifier 330 and/or secondary restoration device identifier 340. In block 540, monitoring module may determine whether the cycles 350 exceed a threshold value.

In block 530, monitoring module 430 may further determine changes in cycle times 350 over time to determine if pairings are degrading (e.g., changes in environment 100 are adversely effecting storage of data at source container identifiers 310 to primary restoration device identifiers 330 and/or secondary restoration device identifiers 340). In block 540, monitoring module 430 may further determine whether a cycle time 350 differs by more than a threshold amount from another cycle time 350 and/or from a previously measured cycle time 350.

In one implementation, monitoring module 430 may further monitor transactions in network 120 to determine that data from source containers 140 is transferred to one or more restoration devices 170. Monitoring module 430 may further determine whether any drop messages or other indications/messages of data backup failure are present in environment 100. Controller 110 may also compare data stored at a source container identifier 310 to data stored at a restoration device identifier 330 or 340, such as comparing data attributes (e.g., comparing data version identifiers) and/or to sampling and comparing portions of the data, to verify that the source data is being correctly backed up.

As shown in FIG. 5, if the execution of the commands does not satisfy a desired condition (block 540—No), command generation module 420 may revise the commands and/or the pairings (block 550). For example, controller 110 may re-pair a source container identifier 310 with another primary restoration device identifier 330 and/or another secondary restoration device identifier 340. Controller 110 may also reorder the commands and/or modify when the commands are to be executed, such as to modify a time to perform an asynchronous data transfer. Controller 110 may further provide a notification, such as a message to a user, when the execution of the commands does not satisfy a desired condition.

As shown in FIG. 5, process 500 may further include determining actual pairings of source and target frames used to backup data at the source frames (block 560) and determining whether the actual pairings of the source and target frames satisfy desired conditions (block 570). As previously described, data from a source frame may be stored asynchronously such that the source frame data is scheduled to be backed up to one or more target frames at a later time. However storage replication problems may arise, for example, if the source frame is no longer active at the later time (e.g., a source device 130 is not longer active and/or the source frame is not longer storing data to be backed up at the later time). In this situation, available target frames may be left unused and/or may unnecessarily store data from inactive storage frames. Similarly, storage replication problems may arise if the intended target frames are not available at the later time. For example, it may be difficult to reserve the target frames, and the target frames may already be tasked to store other data before the source data can be written to the target frames. Similarly, the target frames may be unavailable due to some type of error and/or may be receiving maintenance at the scheduled time backing up data. In this situation, the source data may be left unpaired (e.g., the source frame is not replicated) or may be paired with one or more different target frames that are not desirable. For example, the actual target frames used to store the source data may result in undesirable fragmentation of the source data and/or may have other characteristics that delay or limit backing up of the source frames.

In block 560, monitoring module 430 may periodically query source containers 140 and/or restoration devices 170 using host component commands to determine the status of source containers 140 and/or restoration devices 170, such as to determine whether source containers 140 and/or restoration devices 170 are active to receive and/or output data. Controller 110 may also verify that active source containers 140 and/or restoration devices 170 are functional (e.g., sending and/or receiving data). Monitoring module 430 may also verify that inactive source containers 140 and/or restoration devices 170 are not functional (e.g., not storing data to be backed up at a restoration device 170).

In block 560, monitoring module 430 may further verify that each of the active source containers 140 is linked to one or more restoration devices 170, such as examining the actual pairings (e.g., identifying target frames where the source frames are stored) to verify that each of the active source containers 140 is included in an actual pairing. Monitoring module 430 may further verify that that control data 300 correctly identifies desired parameters, such as verifying that control data 300 identifies active source containers 140 and correctly lists information pairing the active source containers 140 and restoration devices 170.

For example, monitoring module 430 may verify that that control data 300 includes a remote replication session group identifier associated with cloud-based storage 150; frame serial numbers, volume (or device) serial numbers (VOLSERs), UCB identifiers, and/or SYM addresses associated with source containers 140 and/or restoration devices 170; a target frame serial number; storage group volume (or device) assignments; etc. Monitoring module 430 may further verify that primary restoration device identifiers 330 are associated with sufficient storage space to accommodate data associated with source container identifiers 310, and that secondary restoration device identifiers 340 are associated with sufficient storage space to accommodate data associated with primary restoration device identifiers 330.

Monitoring in block 560 may occur at particular intervals. For example, monitoring module 430 may monitor environment 100 at times (e.g., hourly, daily, etc.) to determine if cloud-based storage 150 is stable and properly configured (e.g., determining whether paired restoration devices 170 provide sufficient storage space for one or more backup copies of data at source containers 140). Additionally or alternatively, monitoring in block 560 may occur following particular occurrences. For example, controller 110 may evaluate environment 100 active a source container identifier 310 is activated and/or following the transfer of data from a source container 140 or between restoration devices 170.

If the actual pairing of source and target frames does not satisfy a desired condition (block 570—No), command generation module 420 may revise the commands and/or generate new pairings in block 550. For example, new pairings between the active source frames and available target frames may be determined and storage commands may be generated based on the new pairings.

FIG. 6 shows an exemplary process 600 for pairing active source frames to available sets of target frames (e.g., a first set of target frames for backing up the source frames and second set of target frames for backing up the first set of target frames) in block 510 according to one implementation. Process 600 is described with respect to components in environment 100 and control data 300 in FIGS. 3A-3C. In one implementation, process 600 may be performed by controller 110. Alternatively, or additionally, some or all of process 600 may be performed by another device or group of devices, including or excluding controller 110.

As shown in FIG. 6, process 600 may include determining volume (or device) reports (VOLRPTs) for the source and target frames (block 610) and determining logical partitions for each SMSplex for the source and target frames (block 620). The VOLRPTs determined in block 610 may include information regarding the source and target frames, such as an indication of volume relationships revealing the internal address for each logical address or Unit Control Block (UCB) in a storage array connected to a mainframe via a block multiplexer channel. VOLRPTs may be determined, for example, by querying the source devices 130 and target devices 160 included in a remote replication session to determine the internal addresses associated with the source and target frames.

Logical partitions of the source frames may be determined for the SMSplex associated with the source and target frames in block 620 using, for example, a utility to provide a listings and summarizations of the Direct Access Storage Device (DASD) environment associated with the remote replication session containing the source and target frames, such as a DCOLLECT utility for Z/OS-based volumes and datasets by IBM®. Determining the logical partitions of the source frames may include identifying characteristics of the data stored at the source and the paired target frames.

As shown in FIG. 6, process 600 may also include determining a volume mapping (VOLMAP) identifying a cross reference of the frame configuration from prior pairings of source and target frames (block 630). The volume mapping may reveal, for example, how the addresses for the source and targets frames are mapped within the intended logical device.

As shown in FIG. 6, process 600 may further include applying logical rules to generate cross-references for pairings of source and target frames based on the volume reports, the logical partitions, and the volume mappings (block 640). The cross-references (XREF) may include, for example, pair relationships laid out in a tabular form and may include identifying, for example, an remote replication session group; a Source Frame Serial Number; a Target Frame Serial Number Source VOLSER (if knowable) or a UCB; Source (R1) UCB; Source (R1) SYM address; a Target (R2) UCB; a Target (R2) SYM; a Target (R2) clone UCB; Target (R2) Clone SYM; a Storage Group volume belongs to Source Capacity in MB; and/or a Source Allocation in MB. For example, data from the VOLRPT and the VOLMAP may be loaded into a spreadsheet, and the logical rules may be applied to create pairings of source and target frames and pairings of target frames to secondary target frames. For example, source and target frames may be paired to store similar data (e.g., logically related data, data stored at contiguous source frames, data sharing a characteristic, etc.) to contiguous frames to minimize write time, to activate contiguous frames, etc. In another example, various different source frames having certain shared characteristics (e.g., storing related data) may be logically grouped and paired with target frames in a logical grouping.

Continuing with FIG. 6, process 600 may additionally include generating remote replication session descriptive parameter based on the XREF data (block 650). For example, the XREF data may be uploaded to source devices 130 and target devices 160 in the remote replication session system to update remote replication session descriptive parameters regarding operation of source devices 130 and target devices 160. In operation, the XREF data may be converted for transfer to source devices 130 and target devices 160, such as to convert the XFEF data from the spreadsheet used in block 640 into a text data file that may be used by source device 130 and target device 160.

FIGS. 7A and 7B show an exemplary process 700 for generating and executing storage commands based on the pairings in block 520 according to one implementation. Process 700 is described with respect to components in environment 100 and control data 300 in FIGS. 3A-3C. In one implementation, process 700 may be performed by controller 110. Alternatively, or additionally, some or all of process 700 may be performed by another device or group of devices, including or excluding controller 110.

As shown in FIG. 7A, process 700 may include generating configuration decks for the source and target devices based on the generated cross-references (block 710). For example, an asynchronous data transfer from a source frame to a first target frame may be organized within a configuration deck with respect to synchronous data transfers and other asynchronous data transfers from other source frames. For example, the source configuration deck may include ordered read-type commands to copying data from frames at source devices 130 first for synchronous data transfers and then for asynchronous data transfers to paired frames at target devices 160. A target-side deck may include ordered commands to copy data from the first target frame (after data is copied from the source frames) to paired second target frames in the desired order associated with timing the synchronous and asynchronous data transfers.

As shown in FIG. 7B, generating the configuration decks for the source and target devices based on the generated cross-references may include, for example, generating first commands for implementing an remote replication session to back up data from frames at source device 130 to first frames at target device 160 (block 711) and generating second commands for copying data from the first target frames to second target frames at target device 160 (block 712). For example, generating the commands for implementing the remote replication session to back up data from frames at source device 130 to target device 160 may include generating commands for suspending inactive remote replication session pairs, such as pairs including inactive source frames (block 713); generating commands for moving remote replication session pairs such as to re-allocate a target frame from an inactive source frame to a different, active source frame (block 714); generating commands for maintaining remote replication session pairs to continue backing up data at a source frame to an associated target frame (block 715); generating commands for displaying remote replication session pairs to report the pairs to a user (block 716); and generating other host component commands related to establishing the remote replication session, such commands related to monitoring and maintaining the remote replication session (block 717). As further shown in FIG. 7B, generating commands for mirroring data first from target frames to second target frames at target device 160 in block 712 may include, for example, generating mirror commands to store data at a second target frames that allows data at another, first target frame to be recovered, such as data identifying changes to the first target frame (block 718); and generating cloning commands to copy data stored at one target frame to a second target frame (block 719).

Returning to FIG. 7A, process 700 may include executing the ordered source configuration deck to replicate the data at the source frames to a first set of target frames (block 720), transferring the ordered target configuration deck to the cloud-based storage system 150, such as data replication floor system (block 730), and executing the ordered target configuration deck to clone the data stored at the first set of target frames to a second set of target frames (block 740). As previously described, the source configuration deck may be ordered so that source data is copied to the first set of target based on timing data transfers (e.g., to implement synchronous and asynchronous data storage), and the source configuration deck may be executed in block 720 to achieve the desired timing. Similarly, the target configuration deck may be ordered so that target data from the first set of target frames is copied based on the timing of synchronous and asynchronous data transfers from the source frames. For example, data should first be written from a source frame to a paired first target frame before this data is copied to an associated second target frame.

FIG. 8 shows an exemplary process 800 for monitoring execution of storage commands in block 530 according to one implementation. Process 800 is described with respect to components in environment 100 and control data 300 in FIGS. 3A-3C. In one implementation, process 800 may be performed by controller 110. Alternatively, or additionally, some or all of process 800 may be performed by another device or group of devices, including or excluding controller 110.

As shown in FIG. 8, controller 110 may determine a time to execute a source configuration deck associated with establishing a remote replication session to backup data stored at source frames to corresponding target frames for executing prior configuration decks (block 810). For example, controller 110 may determine a time required to access (e.g., read) data at the source frames and to write this data to the paired target frames. As shown in FIG. 8, process 800 may also include comparing the time for executing the source configuration deck with times associated with executing prior source configuration decks (block 820) and determining trends in times associated with the source execution decks (block 830). For example, controller 110 may determine how the execution time associated with a new source configuration deck compares with an average time for executing two more prior source configuration decks. If the execution time associated with a new source configuration deck or one or more commands within the source configuration deck exceeds a threshold (e.g., exceeds an execution time for one or more commands for prior configuration decks), this may suggest that the remote replication session configuration is faulty. For example, the execution time for storing source data to a target frame may exceed a threshold if the target frame is unavailable and/or already allocated to store different data. Similarly, if a trend analysis shows that execution times are increasing, this may suggest that the remote replication session configuration needs to be redesigned. For example, source data may be increasingly segmented or fragmented between different target devices 160, increasing write times to complete the remote replication session configuration.

FIG. 9 shows an exemplary process 900 for determining actual pairings of source and target frames in block 560 according to one implementation. Process 900 is described with respect to components in environment 100 and control data 300 in FIGS. 3A-3C. In one implementation, process 900 may be performed by controller 110. Alternatively, or additionally, some or all of process 900 may be performed by another device or group of devices, including or excluding controller 110.

As shown in FIG. 9, process 900 may include determining VOLRPTs (or device reports) and the logical partitions for the source frames (block 910). The VOLRPTs for the source frames may include information regarding the source frames, such as an indication of device relationships revealing the internal address for each logical address or UCB in a storage array connected to a mainframe via a block multiplexer channel. VOLRPTs may be determined, for example, by querying the remote replication session to determine the internal addresses. Logical partitions of the source frames may be determined for the SMSplex associated with the source and target frames in block 610 using, for example, a utility to provide a listings and summarizations of the DASD environment associated with the remote replication session containing the source and target frames, such as the DCOLLECT utility for Z/OS-based devices and datasets.

As shown in FIG. 9, process 900 may also include determining VOLRPTS (or device reports) for first target frames used to store data from source frames (block 920) and determining the status of second target frames used to store backup copy of first target frames (block 930). The VOLRPTs for the first target frames may include information regarding the first target frames, such as an indication of device relationships revealing the internal address for each logical address or UCB in a storage array connected to a mainframe via a block multiplexer channel. VOLRPTs may be determined, for example, by querying the remote replication session to determine the internal addresses. Determining the status of the second target frames may include, for example, performing a business continuance volume (BCV) query associated with the second target frames.

Continuing with FIG. 9, process 900 may further include determining actual cross references (XREFs) for the source and target frames using the device reports, the logical partitions, and the status of second target frames (block 940) and forwarding the XREFs to the source and target devices for comparison with the generated XREFs (block 950). The cross-references (XREF) may include, for example, pair relationships laid out in a tabular form and may identify, for example, an remote replication session group; a Source Frame Serial Number; a Target Frame Serial Number Source VOLSER (if knowable) or a UCB; Source (R1) UCB; Source (R1) SYM address; a Target (R2) UCB; a Target (R2) SYM; a Target (R2) clone UCB; Target (R2) Clone SYM; a Storage Group device belongs to Source Capacity in MB; and/or a Source Allocation in MB.

Continuing with FIG. 9, process 900 may still further include comparing actual cross references for the source and first target frames to verify that data from the source frames are backed up to first target frames (block 960); comparing the actual cross references and the generated cross references to verify correct device placement (block 970); and comparing actual XREFs for the first and second target frames to verify that data from the first target frames are properly backed up the second target frames (block 980). Comparing the actual XREFs to the generated XREFs may include, for example verifying source device status in the target system to verify the source data is correctly backed up to the target frames. Comparing the actual XREFs to the generated XREFs may also include, for example verifying correct device placement of the source data to the target system. To verify that data at first target frames are properly stored to second target frames, changes to the source and first target frame pairings in block 960 may be used to update pairings of first and second target frames in block 980. For example, if a source frames is re-paired with a new, different first target frame to store data from the source frame, the new first target frame may be paired with a second target frame to ensure that the source data is properly backed up at two separate target locations.

In systems and methods described herein, restoration devices 170 in cloud-based storage 150 are paired with source containers 140. A series of commands may be generated based on the pairings to cause copies of data at the source containers 140 to be backed up to the restoration devices 170. For example, a point-in-time copy of the data at the source containers may be stored to a first set of the restoration devices 170, and a second copy of the data may be stored to a second set of the restoration devices 170. The restoration devices 170 may be reallocated from inactive source containers 140 (e.g., source containers 140 no longer storing data). Execution of the commands may be monitored, and the commands may be modified if execution of commands does not satisfy a desired condition. For example, a cycle time, associated with acquiring the data from a source container 140 and copying the data to an associated restoration device 170, may be measured, and if the cycle time exceeds a threshold, the associated command and or a pairing may be modified. The actual pairings from the storage source container 140 and to one or more restoration devices 170 may be also be monitored to verify that the source data is properly backed up, such as to verify that asynchronous data backup was properly performed. The pairings and/or commands may be modified if issues are identified in the actual pairings, such as determining that a source container is not be properly backed up or backed up to the wrong restoration device (also referred to as a device or a volume) 170. For example, the source container 140 may be paired to a different restoration device 170 and the command may be modified to reflect the different pairing.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to FIGS. 5, 6, 7A & 7B, 8 and 9, the order of the blocks may be modified in other implementations. For example, process 500 may further include initiating one or more restoration devices 170 if additional storage capacity is desired in cloud storage 150. Further, non-dependent blocks in processes 500-900 may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein. Furthermore, the term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   identifying, by a processor, a first restoration device included in a plurality of restoration devices associated with a cloud storage system, wherein the first restoration device is paired with a first source container during a first time period, and wherein data stored by the first source container is copied to the first restoration device during the first time period based on the first restoration device being paired with the first source container;
   determining, by the processor, that a second source container is storing data to be backed up during a second time period that is subsequent to the first time period;
   pairing, by the processor, the second source container with the first restoration device during the second time period based on determining that the second source container is storing data to be backed up during the second time period, wherein data stored by the first source container is not copied to the first restoration device during the second time period based on the first restoration device being paired with the second source container;

generating, by the processor, a first command based on pairing the second source container with the first restoration device, wherein the first command causes data stored at the second source container, during the second time period, to be copied to the first restoration device;

determining, by the processor, a first cycle time for copying the data stored at the second source container to the first restoration device; and modifying, by the processor, the first command when the first cycle time is greater than a threshold value.

2. The method of claim 1, further comprising:
identifying a second restoration device included in the plurality of restoration devices; and
generating a second command, wherein the second command causes a copy of data stored at the first restoration device during the second time period to be stored to the second restoration device.

3. The method of claim 2, further comprising:
determining a second cycle time for copying the data stored at the first restoration device to the second restoration device; and
modifying at least one of the first command or the second command when the second cycle time is greater than the threshold value.

4. The method of claim 2, wherein the first command and the second command causes data from the first source container to be copied to the first restoration device before data from the first restoration device is copied to the second restoration device.

5. The method of claim 1, wherein the first source container is included in a plurality of storage containers to be backed up during the second time period, and wherein the method further includes:
determining a plurality of pairings that associate the plurality of storage containers with the plurality of restoration devices; and
generating commands to copy, during the second time period, data from the plurality of storage containers to the plurality of restoration devices based on the plurality of pairings.

6. The method of claim 1, wherein the first command further prevents new data from being stored to the second source container when data from the second source container is being copied to the first restoration device.

7. The method of claim 1, further comprising:
comparing the data stored at the second source container and data stored at the first restoration device; and
modifying, by the processor, the first command when the data stored at the second source container does not correspond to the data stored at the first restoration device.

8. A device comprising:
a memory configured to store control data; and
a processor configured to:
store, in the control data, an indication that a first target location, included in a plurality of target locations associated with a cloud storage system, is paired with a first source location during a first time period, wherein data stored by the first source location is copied to the first target location during the first time period based on the first target location being paired with the first source location, determine that a second source location is storing data to be backed up during a second time period that is subsequent to the first time period, change the control data to pair the second source location with the first target location during the second time period based on determining that the second source location is storing data to be backed up during the second time period, wherein data stored by the first source location is not copied to the first target location during the second time period based on the first target location being paired with the second source location, generate a first command based on pairing the second source location with the first target location, wherein the first command is associated with copying data, stored at the second source location during the second time period, to the first target location, determine an actual pairing identifying an actual target location receiving the data stored at the second source location, compare the actual target location and the first target location, and modify the first command when the actual target location and the first target location differ.

9. The device of claim 8, wherein the processor is further configured to:
identify a second target location included in the plurality of target locations, and
generate a second command, wherein the second command causes a copy of data stored at the first target location during the second time period to be stored to the second target location.

10. The device of claim 9, wherein the processor is further configured to:
determine a cycle time for copying the data stored at the first target location to the second target location; and
modify at least one of the first command or the second command when the cycle time is greater than a threshold value.

11. The device of claim 9, wherein the first command and the second command cause data from the first source location to be copied to the first target location before data from the first target location is copied to the second target location.

12. The device of claim 8, wherein the first source location is included in a plurality of source locations to be backed up during the second time period, and wherein the processor is further configured to:
determine a plurality of pairings that associate the plurality of source locations with the plurality of target locations, and
generate commands to copy, during the second time period, data from the plurality of source locations to the plurality of target locations based on the plurality of pairings.

13. The device of claim 12, wherein the processor is further configured to:
verify that the control data include respective entries for the plurality of source locations, wherein the entries include information pairing each of the plurality of source locations to one or more of the plurality of target location, and
modify the commands when the control data does not include respective entries for the plurality of source locations.

14. The device of claim 8, wherein the processor is further configured to store, in the control data, an indication that the second source location is paired to the first target location and a second target location, included in the plurality of target locations, during the second time period, and
- wherein the first command further causes a first portion of the data stored at the second source location, during the second time period, to be copied to the first target location, and a second portion of the data stored at the second source location, during the second time period, to be copied to the second target location.

15. A non-transitory computer-readable medium to store instructions, the instructions comprising:
- one or more instructions that, when executed by a processor associated with a first device, cause the processor to:
  - pair a first restoration device, included in a plurality of restoration devices associated with a cloud storage system, with a first source container during a first time period, wherein data stored by the first source container is copied to the first restoration device during the first time period based on the first restoration device being paired with the first source container,
  - determine that a second source container is storing data to be backed up during a second time period that is subsequent to the first time period,
  - pair the second source container with the first restoration device during the second time period based on determining that the second source container is storing data to be backed up during the second time period, wherein data stored by the first source container is not copied to the first restoration device during the second time period based on the first restoration device being paired with the second source container,
  - generate a first command based on pairing the second source container with the first restoration device, wherein the first command causes data stored at the second source container, during the second time period, to be copied to the first restoration device,
  - determine an actual pairing identifying an actual restoration device receiving the data stored at the second source container,
  - compare the actual restoration device and the first restoration device, and
  - modify the first command when the actual restoration device and the first restoration device differ.

16. The non-transitory computer-readable medium of claim 15, wherein the instruction further cause the processor to:
- identify a second restoration device included in the plurality of restoration devices, and
- generate second command, wherein the second command causes a copy of data stored at the first restoration device during the second time period to be stored to the second restoration device.

17. The non-transitory computer-readable medium of claim 16, wherein the processor is further configured to:
- determine a cycle time for copying the data stored at the first restoration device based to the second restoration device, and
- modify at least one of the first command or the second command when the cycle time is greater than a threshold value.

18. The non-transitory computer-readable medium of claim 16, wherein the first command and the second command cause data from the first source container to be copied to the first restoration device before data from the first restoration device is copied to the second restoration device.

19. The non-transitory computer-readable medium of claim 15, wherein the first source container is included in a plurality of source containers to be backed up during the second time period, and wherein instructions further cause the processor to:
- determine a plurality of pairings that associate the plurality of source containers with the plurality of restoration devices, and
- generate commands to copy, during the second time period, data from the plurality of source containers to the plurality of restoration devices based on the plurality of pairings.

20. The non-transitory computer-readable medium of claim 19, wherein instructions further cause the processors to:
- determine whether any of the plurality of source containers are not paired with one of the plurality of restoration devices, and
- modify one or more of the commands when any of the plurality of source containers are not paired with one of the plurality of restoration devices.

* * * * *